May 29, 1962   E. B. PICKELL   3,036,826
SPRING CLIP MEANS
Filed Sept. 23, 1960
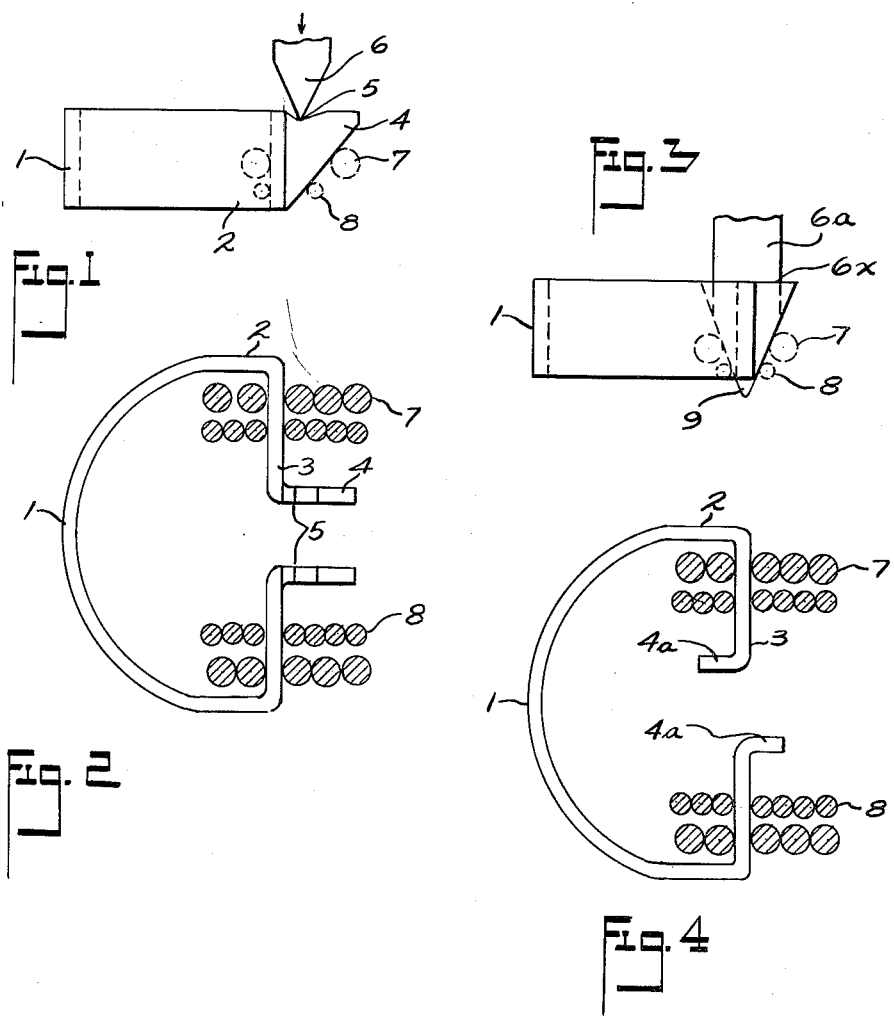
INVENTOR.
EDWARD B. PICKELL
BY
HIS ATTORNEY United States Patent Office 3,036,826
Patented May 29, 1962

3,036,826
SPRING CLIP MEANS
Edward B. Pickell, Holland, Pa., assignor to General Doors Corporation, Bristol, Pa., a corporation of New Jersey
Filed Sept. 23, 1960, Ser. No. 57,996
9 Claims. (Cl. 267—1)

This invention relates to end mounting of closely wound helical springs for service in tension, and more particularly the invention includes novel anchor clip means, applicable to and cooperative with such springs in novel manner.

An object of the invention is to provide mounting for simple cut lengths of such springs, without the more usual forming of the ends thereof for such purpose.

Another object is to provide the same advantages coincidently for a pair or more of such springs, longitudinally coextensive and one disposed within the other, and by the same clip means interconnect the springs for service in unison, or service of either upon failure of the other.

More particularly and as will appear, the invention includes, as further objects, insertion of portions of the clip means into the spring means by simple lateral motion, the clip means including wedge members arranged to both facilitate such insertion and thereafter retain the clip means in mounted position, with other parts of the clip means clasped between adjacent turns of the spring means.

Still another object is to provide tool means, cooperative with such clip means in novel manner, to effect such clip means mounting.

The invention is particularly applicable to interconnected mounting of dual springs for overhead garage doors, wherein a garaged automobile might be substantially damaged upon breakage of a single spring, spring cost is a substantial item due to competition, and the spring may be in the order of two inches in diameter and three feet long. However, the invention is not limited to such dimensions or purposes.

Other objects of the invention include the production of such spring and clip means of the greatest reliability at the lowest cost.

Further objects and advantages will appear from the following description taken in connection with the accompanying drawings, which are somewhat conventionalized and wherein FIG. 1 is a side elevation of a clip according to my invention, indicating a cooperative inserting tool and adjacent turns of an end portion of dual springs between which the clip is being inserted by the tool;

FIG. 2 is a plan view of the same clip, and indicating its relation with the dual springs after completion of the mounting of the clip; and FIGS. 3 and 4 are views corresponding to FIGS. 1 and 2 respectively, but showing clip and tool in slightly modified form.

In the drawings, the same or similar reference characters are applied to the same or corresponding parts.

With reference now to the drawings, and first to FIGS. 1 and 2 thereof, the clip may be formed from a length of strap steel, and for the particular purpose described, in the order of one-eighth inch thickness by three-quarters inch width.

The clip includes, a bail portion 1 with a pair of leg members 2, and inturned members 3 at the ends thereof.

The inturned members 3 are aligned and terminate short of each other, and each is provided with a perpendicularly disposed member 4.

As shown in FIG. 1, the members 4 are of wedge form, and outturned from their members 3.

The wedge members 4 are preferably provided with notches at 5 for proper location of an edged tool 6, extending transversely of the spring means, for mounting of the clip by force lateral of the spring means as by a foot operated air press, not shown.

The location of the notches 5 and the proportions of the parts are such that the clip may be inserted and mounted to interconnect a pair or more of springs, as by the tool 6, with the inturned members 3 transversely disposed in clasped relation between adjacent turns of both springs, the bail portion at the spring end, its leg members 2 longitudinally at opposite sides of the springs, and the wedge members 4 longitudinally extending within the inner spring, as indicated in FIG. 2.

During the insertion operation, the clip may tilt somewhat upon the edge of the tool 6 to accommodate itself between the opposing forces of the temporarily spread turns of the spring or springs between which the wedging effect is being had.

In the drawings, the spring means includes an outer spring 7 and a smaller spring 8 therewithin. FIG. 2 indicates, in broken lines, adjacent turns of these springs during the insertion operation, as spread apart by the wedging effect of the wedge members 4 of the clip, the parts being so proportioned that neither spring is stressed beyond its elastic limit.

As soon as the wedge members 4 enter the hollow of the inner spring 8, both springs recoil into clasping relation against the inturned members 3 of the clip, and thereafter the wedge members positively retain the clip mounted, the tool 6 having been withdrawn.

While FIGS. 1 and 2 of the drawings show the wedge members 4 extending from their inturned members 3 in the direction away from the bail, instead, the wedge members might be inturned.

FIGS. 3 and 4 show another modification of the invention.

Here the wedge members 4a extend in opposite directions and extend only half as far from their inturned members 3 as in FIGS. 1 and 2. As indicated in FIG. 3 the clip mounting tool 6a has a shank portion provided with a shoulder at 6x to bear upon the wedge members 4a for insertion of the inturned members 3, the tool has a wedge portion disposed between the wedge members 4a of the clip, and extending downwardly therebeyond as at 9 to penetrate the spring coils in advance of the mounting operation, and the lateral wedge direction of the shank of the tool is less than that of the wedge members of the clip, so that the inserted clip will be positively retained by the adjacent spring turns upon retraction of the tool.

It will be evident that the invention applies similarly to both ends of the spring means, although one end only is here illustrated.

It may be observed that according to the invention all of the principal members are disposed generally in a common plane.

Each wedge member has a sloping face portion in slanting relation to such plane, and which facilitates mounting of the clip, and each wedge member also has a non-sloping face portion through which the mounting force is applied, and which serves within the spring means to retain the clip after mounting.

The provision of a pair of wedge members, in the disclosed spaced relation therebetween, assists in stabilizing the clip, both during its insertion and thereafter.

What I claim is:

1. Anchor clip means for the purpose described and comprising
    a bail portion including a pair of leg members, with inturned members at the ends thereof,
    and wedge members extending perpendicularly from the inner ends of said inturned members, all of said members being disposed generally in a common plane, each of said wedge members having a surface portion leading from its said inturned member in slanting relation to said plane.

2. Means as set forth in claim 1, wherein said wedge members are provided, opposite their said sloping surface portions, with notches for seating therein of a tool.

3. Means as set forth in claim 1, wherein said wedge members extend from their said inturned members, away from said bail portion.

4. Means as set forth in claim 1, wherein said wedge members extend in opposite directions from their said inturned members.

5. Means as set forth in claim 1, wherein said inturned members terminate from their said leg members, substantially short of each other, whereby said wedge members are in spaced relation to each other.

6. In combination with closely wound helical spring means, anchor clip means for mounting an end thereof for service in tension, said clip means including a bail portion embracing an end portion of said spring means with leg members longitudinally disposed in straddling relation thereto, inturned members at the ends of said leg members transversely disposed between adjacent turns of said spring means and extending therewithin, and clip retaining wedge members extending from the inner ends of said inturned members longitudinally of said spring means, each said wedge member having a pair of convergently opposed surface portions including a portion perpendicular to its said inturned member, and the other portion slantingly extending from its said inturned member.

7. Means as set forth in claim 6, wherein said wedge members are disposed to facilitate lateral insertion of said inturned members between said turns.

8. Means as set forth in claim 6, wherein said spring means includes a pair of longitudinally coextensive springs, arranged one within the other, and said inturned members extend between turns of both, whereby said springs are interconnected by said clip means for said service in unison.

9. Means as set forth in claim 1, wherein said clip means is formed from a single strip of material, with bends made transversely thereof, and said wedge member surface portions are provided by diagonal ends of said strip.

References Cited in the file of this patent
UNITED STATES PATENTS

| | | |
|---|---|---|
| 1,588,471 | Bezkorowajnyj | June 15, 1926 |
| 1,664,647 | Sundstrand | Apr. 3, 1928 |
| 2,793,413 | Oder | May 28, 1957 |